April 7, 1953            J. A. HUNT            2,634,181
RETRACTILE TRAY FOR AUTOMOBILE INSTRUMENT PANELS
Filed Nov. 15, 1950
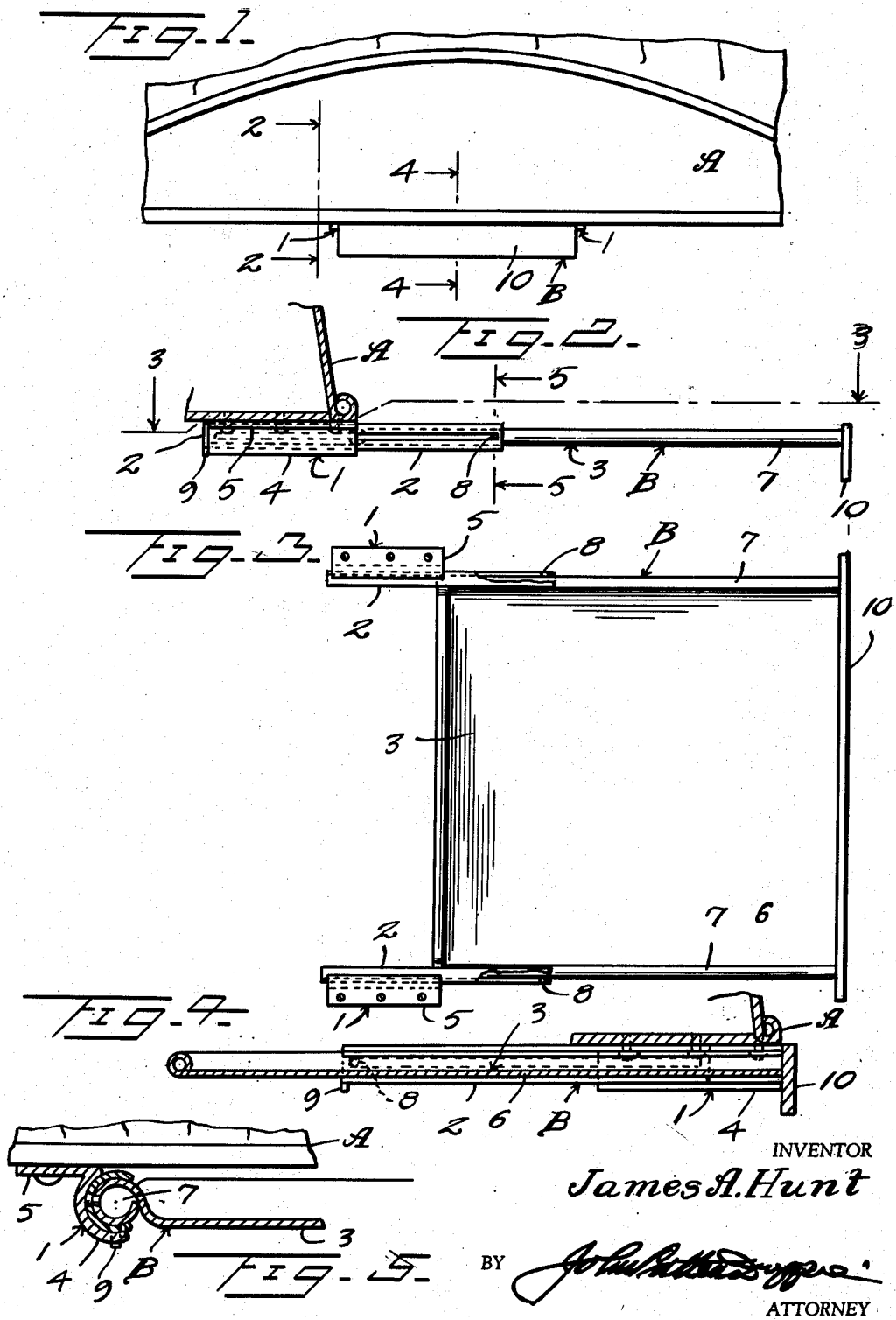
INVENTOR
James A. Hunt
BY
ATTORNEY Patented Apr. 7, 1953

2,634,181

UNITED STATES PATENT OFFICE 2,634,181

RETRACTILE TRAY FOR AUTOMOBILE INSTRUMENT PANELS

James Austin Hunt, Evansville, Ind.

Application November 15, 1950, Serial No. 195,757

1 Claim. (Cl. 311—21)

This invention relates to retractile trays for automobile instrument panels.

Many persons patronize drive-in restaurants and theatres where they are served food and drinks in the car, but the serving tray that is brought to the car by the attendant does not fill this need, as it is only convenient to the person sitting at the particular window where the tray is placed.

The primary object of my invention is to provide a retractile tray of the character specified that is mounted directly under the instrument panel of the automobile and may be readily pulled out in open or serving position.

A further object of my invention is to provide a retractile tray for automobile instrument panels having novel means for operatively supporting the tray in position and for limiting the outward and inward sliding movement of the latter.

In the accompanying drawings, which are for illustrative purposes only and are therefore not drawn to scale:

Figure 1 is a front elevation, illustrating the application of my sliding retractile tray under the instrument panel of an automobile of any standard or well known make, with the tray in closed or out-of-the-way position.

Figure 2 is a vertical longitudinal section, taken on line 2—2 of Figure 1, with the tray in open or serving position.

Figure 3 is a horizontal section, taken on line 3—3 of Figure 2.

Figure 4 is a vertical longitudinal section, taken on line 4—4 of Figure 1, and Figure 5 is a vertical transverse section, taken on line 5—5 of Figure 2.

Referring to the drawings for a more particular description of my invention, and in which drawings like parts are designated by like reference characters throughout the several views, A designates the instrument panel of an automobile of any standard or well known make, and B my novel retractile service tray, as a whole.

As shown, the device is slidably mounted directly under the instrument panel A of the car and essentially comprises the stationary supporting brackets 1, elongated extension slides 2 and retractive service tray 3.

The supporting brackets 1 comprise the body portions 4, of semi-circular form in cross section, formed at their upper edges with the straight flat horizontal flanges 5, which are screwed or otherwise attached to the automobile body directly under the instrument panel. The extension slides 2 are preferably of semi-circular form in cross section and work in the stationary supporting brackets 1. The retractile service tray 3 is preferably of rectangular oblong form and consists of the flat table or body portion 6 on which the food or containers are placed, said table 6 formed at its side edges with the inwardly bent tubular beads 7 which have limited sliding movement in the extension slides 2. Suitable stops 8 are provided to limit the sliding movement of the service tray with respect to the extension slides 2 and other stops 9 provided to limit the sliding movement of the extension slides 2 in the stationary supporting brackets 1.

The front end of the service tray 3 is formed with a depending flange or panel 10, which is disposed beneath the instrument panel A when the tray is in closed or out-of-the-way position.

In practice, the service tray may be instantly pulley out into open or serving position merely by exerting a pull on the panel 10 and may be easily and readily returned into closed or out-of-the-way position by pushing on the aforesaid panel.

Having described my invention, what I claim as new and desire to secure by Letters Patent is:

A retractile tray for automobile instrument panels, comprising horizontal stationary supporting brackets, consisting of body portions of semi-circular form in cross section formed at their upper edges with straight flat horizontal flanges fastened to the automobile body directly under the instrument panel, elongated extension slides of semi-circular form in cross section, carried by and mounted in said horizontal supporting brackets, a service tray comprising a flat table formed at its side edges with inwardly bent tubular beads, having limited sliding movement in said extension slides, a depending panel at the front end of said service tray, and stops to limit the sliding movement of the extension slides and tray.

JAMES AUSTIN HUNT.

REFERENCES CITED

The following references are of record in the file of this patent:

UNITED STATES PATENTS

| Number | Name | Date |
|---|---|---|
| 825,695 | Beaudet | July 10, 1906 |
| 1,486,364 | Chapman | Mar. 11, 1924 |
| 2,125,476 | Westrope et al. | Aug. 2, 1938 |
| 2,170,013 | Detwiler | Aug. 22, 1939 |
| 2,199,981 | Bell | May 7, 1940 |
| 2,205,974 | Kramer | June 25, 1940 |
| 2,292,797 | Roberts | Aug. 11, 1942 |
| 2,293,364 | Schigut | Aug. 18, 1942 |
| 2,443,381 | Farrar, Jr. | June 15, 1948 |
| 2,546,459 | Lee | Mar. 27, 1951 |